(12) United States Patent
Zhang et al.

(10) Patent No.: US 11,219,968 B2
(45) Date of Patent: Jan. 11, 2022

(54) LASER PROCESSING HEAD WITH TWO NOZZLES AND SYSTEMS AND METHODS THEREFOR

(71) Applicant: Ningbo Institute of Materials Technology & Engineering, Chinese Academy of Sciences, Zhejiang (CN)

(72) Inventors: Wenwu Zhang, Zhejiang (CN); Tianrun Zhang, Zhejiang (CN); Chunhai Guo, Zhejiang (CN); Yang Yang, Zhejiang (CN)

(73) Assignee: Ningbo Institute of Materials Technology & Engineering, Chinese Academy of Sciences, Zhejiang (CN)

(*) Notice: Subject to any disclaimer, the term of this patent is extended or adjusted under 35 U.S.C. 154(b) by 967 days.

(21) Appl. No.: 15/523,229

(22) PCT Filed: Sep. 30, 2015

(86) PCT No.: PCT/CN2015/091204
§ 371 (c)(1),
(2) Date: Apr. 28, 2017

(87) PCT Pub. No.: WO2016/066005
PCT Pub. Date: May 6, 2016

(65) Prior Publication Data
US 2017/0320166 A1     Nov. 9, 2017

(30) Foreign Application Priority Data
Oct. 28, 2014   (CN) .......................... 201410586246.1

(51) Int. Cl.
*B23K 26/14*     (2014.01)
*B23K 26/06*     (2014.01)
(Continued)

(52) U.S. Cl.
CPC ............ *B23K 26/06* (2013.01); *B23K 26/146* (2015.10); *B23K 26/1464* (2013.01); *B23K 26/1476* (2013.01); *B23K 26/389* (2015.10)

(58) Field of Classification Search
CPC ......... B23K 26/06; B23K 26/14; B23K 26/38
(Continued)

(56) References Cited

U.S. PATENT DOCUMENTS 4,689,467 A * 8/1987 Inoue ..................... B23K 10/00
219/121.6
6,316,743 B1 * 11/2001 Nagahori ............... B23K 26/04
219/121.67
(Continued)

FOREIGN PATENT DOCUMENTS

CN        101396768       4/2009
CN        101534990       9/2009
(Continued)

*Primary Examiner* — Tu B Hoang
*Assistant Examiner* — Masahiko Muranami
(74) *Attorney, Agent, or Firm* — Brandon V. Zuniga; James R. Gourley; Carstens & Cahoon. LLP (57) ABSTRACT

A laser processing head (100) comprises a first-level nozzle (110) and a second-level nozzle (120) that communicate with each other, wherein the second-level nozzle (120) is arranged downstream of the first-level nozzle (110); an inner diameter of the second-level nozzle (120) gradually decreases in a laser transmission direction, and minimum inner diameter of the first-level nozzle (110) is larger than the inner diameter of a tail end of the second-level nozzle (120). The laser processing head (100) solves the contradiction between high energy density laser and the system reliability through gradual coupling. Also provided are a laser processing system and a laser processing method.

17 Claims, 3 Drawing Sheets

(51) Int. Cl.
    *B23K 26/146* (2014.01)
    *B23K 26/382* (2014.01)
(58) Field of Classification Search
    USPC .......................................... 219/121.6–121.86
    See application file for complete search history.

(56) References Cited

U.S. PATENT DOCUMENTS

| | | | | | |
|---|---|---|---|---|---|
| 9,227,269 | B2 * | 1/2016 | Kobler | ................... | B23K 26/38 |
| 2001/0040152 | A1 * | 11/2001 | Higashi | ................... | B23K 26/18 |
| | | | | | 219/121.72 |
| 2005/0193557 | A1 * | 9/2005 | Ko | ......................... | B41J 2/1603 |
| | | | | | 29/890.1 |
| 2007/0278195 | A1 * | 12/2007 | Richerzhagen | .... | B23K 26/0665 |
| | | | | | 219/121.69 |
| 2008/0099452 | A1 * | 5/2008 | Akiyama | ............ | B23K 26/1482 |
| | | | | | 219/121.67 |
| 2009/0045177 | A1 * | 2/2009 | Koseki | ................ | B23K 26/0643 |
| | | | | | 219/121.67 |
| 2009/0084765 | A1 * | 4/2009 | Muratsubaki | ........ | B23K 26/146 |
| | | | | | 219/121.67 |
| 2010/0108648 | A1 * | 5/2010 | Koseki | .................... | B26F 3/004 |
| | | | | | 219/121.67 |
| 2010/0163539 | A1 * | 7/2010 | Fukushima | ......... | B23K 26/0823 |
| | | | | | 219/121.72 |
| 2010/0226135 | A1 * | 9/2010 | Chen | .................... | B23K 26/146 |
| | | | | | 362/318 |
| 2010/0282725 | A1 | 11/2010 | Johnson et al. | | |
| 2014/0231085 | A1 * | 8/2014 | Zediker | .................. | E21B 29/02 |
| | | | | | 166/288 |

FOREIGN PATENT DOCUMENTS

| | | | | |
|---|---|---|---|---|
| JP | H10113786 | | 5/1998 | |
| JP | H11123578 | | 5/1999 | |
| JP | 20001047271 | | 2/2001 | |
| JP | 2008098216 A | * | 4/2008 | ......... B23K 26/0853 |

* cited by examiner

LASER PROCESSING HEAD WITH TWO NOZZLES AND SYSTEMS AND METHODS THEREFOR

CROSS REFERENCE TO RELATED APPLICATIONS

This application is a continuation application of PCT Patent Application No. PCT/CN2015/091204, entitled "Laser Processing Head, Application Thereof, Laser Processing System, and Laser Processing Method", filed on Sep. 30, 2015, which claims priority to Chinese Patent Application No. 201410586246.1, filed on Oct. 28, 2014, entitled "Laser Processing Head, Application Thereof, Laser Processing System, and Laser Processing Method", the entire contents of which are incorporated herein by reference.

TECHNICAL FIELD

The present disclosure relates to the technical field of laser processing, and more particularly, to a laser processing head, application thereof, a laser processing system, and a laser processing method, which are applied in high energy laser processing.

BACKGROUND

High-energy lasers, such as kilo-watt continuous wave fiber lasers, $CO_2$ lasers, solid lasers, and high-power pulsed lasers, have been widely used in removal processing in industrial manufacture. In laser removal processing, if the pulse width is relatively large (larger than 10 ps), the removal mechanism is that melting and sublimation coexit, and the material is removed from the substrate with the help of auxiliary gas. A large amount of heat will be generated in the process, thereby affecting the processed workpiece. In many cases, e.g., during processing heat sensitive materials and drilling metal, the workpiece should be protected from being affected by heat as far as possible.

In order to reduce the thermal effect, researchers have taken a series of measures in the field of laser processing, one of which is to reduce the thermal effect in laser processing by using auxiliary fluids such as water flow.

Some relevant reports reveal that laser is coupled in water flow, thereby combing the water cooling effect with the laser processing effect, and removing the material with laser mainly as well as limiting the thermally affected area through cooling of water flow. With the similar concept, the European company SYNOVA invented a micro jet laser processing system, wherein micro water jet is formed through a high pressure cavity and a jewel nozzle, then the laser is converged into the jewel nozzle; consequently, the pulsed laser is emitted along with the water jet flow with a diameter less than 100 micron, forming natural photoconductive effect in the air, namely, realizing transmission through total reflection over a long distance with very low loss; therefore, the water jet flow coupled with pulsed laser energy can realize processing with least thermal effect through nanosecond pulsed laser.

The concept above relies on the photoconductive effect of the water jet flow in the air. Theoretically, once the layered water flow and the air interface are not present, the photoconductive effect will be no longer in existence. Therefore, the water assisted laser processing method above has great difficulties in realizing a super large-depth processing (greater than 10 mm).

The US company GE invented a liquid-core optical fibre laser processing system, which adopts a hollow pipe, light transmission factor of which is less than that of water; the hollow pipe is made of special polymer, Teflon, whose melting point is less than 400° C.; When water flows through the hollow pipe, a photoconductive system is formed between the water and the pipe wall. It's testified that the photoconductive system can transmit nanosecond green light with energy over 4 $GW/cm^2$, which meets energy requirements for laser processing in many applications. What's more, the hollow pipe above can deep enter water for laser processing, and theoretically, it can be drilled into materials to realize laser removal processing without depth limitation.

However, both kinds of laser processing systems above and other water assisted laser processing systems in the art are faced with a technical problem, namely, on one hand, the inner diameter of the nozzle or that of the hollow pipe needs to be small enough to produce micro jet, so as to enhance the energy density of the laser after coupling; on the other hand, it is strictly required to prevent the hollow pipe from being damaged by laser at the narrow incidence opening. Take the micro jet laser processing system of SYNOVA as an example, although the system has good effects in processing thinner devices when it is in normal operation, its reliability is difficult to be improved, because the nozzle is apt to be damaged. The reason that the nozzle is apt to be damaged is that a position drift of light spot may occur during the operation of the system, when high energy laser directly strikes the non hollow position at the nozzle, the expensive jewel nozzle may be damaged directly; moreover, even if there is no position drift of light spot, when impurity particles pass through the narrow nozzle, the impurity particles will sublimate, generating high temperature plasma, corroding the incidence opening, thereby damaging the nozzle.

Due to the reasons above, in order to ensure the reliability of the system, the applicable power of the water assisted laser processing system is lower. In order to further improve the laser processing ability, the contradiction between the high energy density laser coupled and the system reliability has become a problem to be solved urgently.

SUMMARY

The present disclosure aims to provide a laser processing head, application thereof, a laser processing system, and a laser processing method, so as to solve the contradiction between the high energy density laser coupled and the system reliability during the laser processing effectively.

An objective of the present disclosure is realized by the following technical scheme.

A laser processing head, configured to transmit laser to a workpiece to be processed, wherein the laser processing head comprises:

a first-level nozzle, and a second-level nozzle, which is arranged downstream of the first-level nozzle 110 and communicates with the first-level nozzle;

wherein, an inner diameter of the second-level nozzle gradually decreases in a laser transmission direction, and a minimum inner diameter of the first-level nozzle is larger than an inner diameter of a tail end of the second-level nozzle.

In one of the embodiments, the laser processing head further comprises a focus lens, which is arranged upstream of the first-level nozzle.

In one of the embodiments, the laser processing head further comprises a transparent window, which is arranged upstream of the focus lens.

In one of the embodiments, the minimum inner diameter of the first-level nozzle is greater than twice of diameter of the light spot formed by the laser focused; the inner diameter of the tail end of the second-level nozzle is less than half of the minimum inner diameter of the first-level nozzle.

In one of the embodiments, the first-level nozzle and the second-level nozzle are integrally molded.

In one of the embodiments, the first-level nozzle and the second-level nozzle are made of a metal tube, glass tube, ceramic tube, or plastic tube, which has a smooth inner wall.

In one of the embodiments, the laser processing head further comprises a first cavity and a second cavity;

the first cavity communicates with the first-level nozzle; the second cavity communicates with the second-level nozzle.

In one of the embodiments, the first cavity is provided upstream of the first-level nozzle;

an outer wall of the first-level nozzle is designed to be curved surface forming a gradually decreased diameter;

a section of the second-level nozzle, which has greater inner diameter, is arranged to enclose a periphery of the first-level nozzle;

the second cavity is arranged between the outer wall of the first-level nozzle and the inner wall of the second-level nozzle.

A laser processing system comprises:

a laser device, which is configured to generate laser;

the laser processing head above, which is configured to transmit the laser to the workpiece to be processed;

a first supply unit, which is configured to provide a first fluid with certain pressure for the laser processing head;

a second supply unit, which is configured to provide a second fluid with certain pressure for the laser processing head; and a control unit, which is configured to control operation of the first supply unit, the second supply unit, and the laser device.

In one of the embodiments, refractive index of the first fluid is greater than refractive index of the second fluid.

In one of the embodiments, the first fluid is liquid, and the second fluid is gas.

In one of the embodiments, refractive index of the first-level nozzle of the laser processing head is less than refractive index of the first fluid.

In one of the embodiments, the laser processing system further comprises an optics unit which is arranged between the laser device and the laser processing head.

A laser processing method comprises steps of:

S100. focusing laser, and coupling focused laser into a first fluid in a first-level nozzle;

S200. the first fluid coupled with laser flowing into a second-level nozzle and being enveloped by a second fluid in the second-level nozzle;

S300. under double constraints of the second-level nozzle and the second fluid, diameter of the first fluid coupled with laser decreasing gradually, and finally, a laser fluid jet being formed and emitting from the tail end of the second-level nozzle; and S400. the laser fluid jet acting on a workpiece to be processed, thereby realizing laser processing.

In one of the embodiments, the first fluid is liquid, and the second fluid is gas.

In one of the embodiments, refractive index of the first fluid is greater than refractive index of the second fluid.

In one of the embodiments, a minimum inner diameter of the first-level nozzle is greater than twice of a diameter of a light spot formed by the laser focused;

an inner diameter of a tail end of the second-level nozzle is less than half of the minimum inner diameter of the first-level nozzle.

In one of the embodiments, diameter of the laser fluid jet is regulated through regulating pressure of the first fluid and the second fluid.

Use of the laser processing head, wherein, the laser processing head deep enters a workpiece or fluid for laser processing operation.

The present disclosure has the following beneficial effects:

The laser processing head, the application thereof, the laser processing system, and the laser processing method provided by the present disclosure solve the contradiction between the high energy density laser and the system reliability through gradual coupling. During laser processing, firstly, the laser is coupled into the first fluid in the first-level nozzle. The diameter of the first-level nozzle is larger, so the difficulty of laser coupling is reduced, and the laser processing head is prevented from being damaged by a position drift of light spot or corrosion of impurity particles, thereby increasing the system reliability. Secondly, under the external constraints, the diameter of the first fluid decreases gradually, and the laser fluid jet is formed finally and exits therefrom. During the decreasing of the first fluid, the laser beam coupled into the first fluid converges gradually and the laser energy density increases gradually, thereby emitting laser fluid jet of high energy. With this laser energy output manner, an extremely fine laser fluid jet can be generated, which can break through the prior art ultimate resolution limit for focusing laser, and can obtain an ultimate resolution limit up to 5 μm or even to a submicron size, while possess the processing ability in a depth far larger than the diameter of the water flow at the terminal end. Finally, because of the enhanced reliability, the water assisted laser processing through kilo-watt laser becomes possible and the processing rate is increased relative to the water assisted laser processing in the art.

DETAILED DESCRIPTION OF DISCLOSED EMBODIMENTS

Embodiments of the present invention will be described in more details as follows. It should be understood that the embodiments described are just illustrations and explanations of the present invention, but not intended to limit the scope of the invention. For the convenience of describing the position relations of various components, the laser transmission direction is defined to be the downstream, conversely, to be the upstream direction.

The present disclosure provides a laser processing head, which transmits the laser emitted from a laser device to the workpiece to be processed, and is particularly applicable to transmitting high energy laser.

Figure 1:
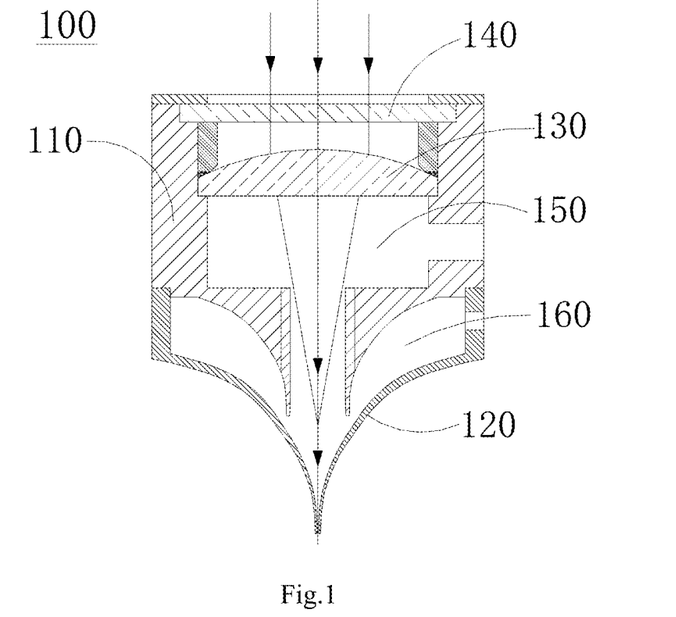
FIG. 1 is a structural schematic diagram illustrating the laser processing head according to one embodiment of the present invention.

As shown in FIG. 1, the laser processing head 100 of the present disclosure includes a first-level nozzle 110 and a second-level nozzle 120, which communicate with each other. Wherein, the second-level nozzle 120 is arranged downstream of the first-level nozzle 110, namely, the laser emitted from a laser device enters the first-level nozzle 110 first, then enters the second-level nozzle 120. The arrow in the figure points to the laser transmission direction.

The inner diameter of the second-level nozzle 120 gradually decreases in the laser transmission direction, and the minimum inner diameter of the first-level nozzle 110 is larger than the inner diameter of a tail end (where the laser exits) of the second-level nozzle 120.

It should be noted that, in the present disclosure, the inner diameter of the first-level nozzle 110 may be either constant or varied. Preferably, as shown in FIG. 1, the inner diameter of the first-level nozzle 110 is constant, namely, the inner diameter is consistent. In this case, the minimum inner diameter is the inner diameter. The design of constant inner diameter is beneficial to primary coupling of laser, and can effectively avoid energy loss of laser during the primary coupling.

In operation, a first fluid with certain pressure is fed into the first-level nozzle 110 by a first fluid feed 155, and a second fluid with certain pressure is fed into the second-level nozzle 120 by a second fluid feed 165. Wherein, the first fluid is disposed to couple the laser emitted into the first-level nozzle 110, and the second fluid is disposed to envelope the first fluid coupled with laser. During laser processing, firstly, the laser is coupled into the first fluid; secondly, along with the first fluid, the laser coupled into the first fluid enters the second-level nozzle 120; in the second-level nozzle 120, the second fluid envelopes the first fluid coupled with laser. The inner diameter 122 of the second-level nozzle 120 gradually decreases in the laser transmission direction, and the second fluid has certain pressure, so the diameter of the first fluid coupled with laser decreases gradually under double constraints of the second-level nozzle 120 and the second fluid, accordingly, the size of the laser light spot also decreases, and the laser energy density (the laser intensity) increases gradually. At last, enveloped by the second fluid, the first fluid coupled with laser forms the laser fluid jet emitting from the tail end of the second-level nozzle 120. The laser fluid jet acts on the workpiece to be processed, thereby realizing high energy laser processing.

The laser processing head 100 of the present disclosure solves the contradiction between the high energy density laser and the system reliability through gradual coupling. The minimum inner diameter of the first-level nozzle 110 is larger than the inner diameter of the tail end of the second-level nozzle 120, so the first fluid has a relatively larger inner diameter. During laser coupling, the laser light spot with a larger size may be used, thereby reducing the laser energy density in the primary laser coupling, further reducing the risk of damage by the laser to the first-level nozzle 110, and increasing the laser coupling efficiency and the system reliability. What's more, the first-level nozzle 110 can be made of material with low cost and high-temperature resistance, such as quartz tube, which reduces the cost greatly as compared with the jewel nozzle. Additionally, the diameter of the first fluid is decreased gradually through the constraint of the second fluid rather than through the direct constraint of solid, so the laser is efficiently stopped from direct contacting with the second-level nozzle 120 in the region where the laser intensity is increased, further increasing the system reliability. Energies of continuous wave laser with super large power (over 1000 W) or high-average-power pulsed laser (nanosecond laser, picoseconds laser, or femtosecond laser with over hundreds of watts) can be coupled in the extremely fine terminal laser fluid jet, which allows the laser to take its advantages of high removal rate and high processing quality.

Preferably, the inner diameter of the terminal end of the first-level nozzle 110 is less than the inner diameter of the initial end of the second-level nozzle 120. This embodiment assists the second fluid enveloping the first fluid, and can avoid turbulent flow effectively.

In the present disclosure, the final diameter of the first fluid, namely, the diameter of the first fluid when it exits from the tail end of the second-level nozzle 120, can be regulated through regulating the pressure of the first fluid and the pressure of the second fluid, or through changing the diameter of the tail end of the second-level nozzle 120. The basic requirements are to ensure that the first fluid coupled with laser is in a state of laminar flow rather than turbulent flow, thereby enabling the laser to be transmitted smoothly.

During the particular laser processing, the final diameter of the first fluid is related to the power of the laser input and the required laser intensity. For example, as for removal processing through nanosecond pulsed laser, if the laser intensity over 500 MW/cm$^2$ is required, normally the final diameter needs to be less than 100 μm; as for removal processing through 1000 W continuous wave laser, if the laser intensity over 5 MW/cm$^2$ is required, the final diameter needs to be less than 150 μm.

Preferably, as shown in FIG. 1, the laser processing head 100 of the present disclosure further includes a focus lens 130, which is arranged upstream of the first-level nozzle 110. Namely, the laser emitted from the laser device is focused through the focus lens 130 before entering the first-level nozzle 110. The focus lens 130 focuses the laser beam and the laser energy is focused into a light spot, which enables the laser to be coupled into the first fluid more easily and reduces the energy loss during the laser transmission and coupling process.

Wherein, the focal distance and the position of the focus lens 130 may be chosen according to practical requirements. When the first-level nozzle 110 has no light guide structure therein, (namely, when the refractive index of the first fluid is less than or equals to the refractive index of the first-level nozzle 110), the laser can be focused below the exit of the first-level nozzle 110, so as to reduce the energy loss of laser. When there is a light guide structure in the first-level nozzle 110, (namely when the refractive index of the first fluid is greater than the refractive index of the first-level nozzle 110), the laser can be focused at any position of the first-level nozzle 110.

Preferably, the laser processing head 100 further includes a transparent window 140. The transparent window 140 is arranged upstream of the focus lens 130, so as to protect the focus lens 130 from being polluted and avoid affecting the focusing effect. Generally, the transparent window 140 is made of quartz glass.

In order to increase the reliability of laser coupling and protect the laser processing head 100 from being damaged by the incident laser, preferably, the minimum inner diameter of the first-level nozzle 110 is greater than twice of the diameter of the light spot formed by the focused laser, and is preferably ranged from 0.25 mm to 0.75 mm. What's more, in order to increase the energy density of the final output laser, the minimum inner diameter 125 of the second-level nozzle 120 (namely, the inner diameter of the tail end of the second-level nozzle 120) is less than half of the minimum inner diameter of the first-level nozzle 110, and is preferably ranged from 5 μm to 100 μm. If required, the minimum inner diameter of the second-level nozzle 120 can be smaller, even be submicron size.

Further, in order to prevent the laser from damaging the nozzles and to lower the cost, the first-level nozzle 110 can be metal tube, ceramic tube, or glass tube, which has smooth an inner wall. If long term stability can be ensured, the first-level nozzle 110 can also be plastic tube. Wherein, the metal tube can be stainless steel tube or copper tube, and so on; the glass tube can be quartz tube, etc. The second-level nozzle 120 can also be made of any of the above tubes.

As shown in FIG. 1, the laser processing head 100 further includes a first cavity 150 and a second cavity 160. Wherein, the first cavity 150 and the first-level nozzle 110 communicate with each other; the second cavity 160 communicates with the second-level nozzle 120. During the laser processing, the first fluid enters the first-level nozzle 110 through the first cavity 150; the second fluid enters the second-level nozzle 120 through the second cavity 160.

As shown in FIG. 1, in order to make the first fluid flow easily, as one of the implementations, the first cavity 150 is arranged upstream of the first-level nozzle 110. According to the orientations shown in FIG. 1, the first cavity 150 is arranged just above the first-level nozzle 110. In order to make the second fluid flow easily and envelope the first fluid, the outer wall of the first-level nozzle 110 is designed to be arc-shaped surface or any other curved surface forming a gradually decreased diameter 112; the section of the second-level nozzle 120, which has greater inner diameter, is arranged to enclose the periphery of the first-level nozzle 110, forming an arc-shaped region between the outer wall of the first-level nozzle 110 and the inner wall of the second-level nozzle 120. The second cavity 160 is arranged in the arc-shaped region. In this way, the flow uniformity of the second fluid is enhanced, and the first fluid coupled with laser can be enveloped evenly, which is beneficial for laser transmission.

Preferably, in the laser processing head 100 of the present disclosure, the first-level nozzle is connected with the second-level nozzle hermetically. The first-level nozzle 110 and the second-level nozzle 120 are integrally molded and connected with each other, which increases the tightness of the connection between the first-level nozzle 110 and the second-level nozzle 120 and helps control the pressure in the cavities. Additionally, the first-level nozzle 110 and the second-level nozzle 120 can be connected with each other through welding, screw threads or any other sub-assembling manner. The sub-assembly manner is convenient for replacing the second-level nozzle 120.

The laser processing head 100 of the present disclosure can realize output of high energy laser, and it has the advantages of small thermal effect, high processing quality, and high system reliability. When the output laser density reaches a certain value, the laser can be used for cleaning, surface carving, cutting, boring, laser shock processing, etc. As the gradual coupling is adopted, the first-level nozzle 110 is protected from being damaged by the incident laser, and the solid pipe wall is efficiently protected from direct contacting with the laser in the region where the laser intensity is increased. Two layers of fluid (the first fluid and the second fluid) are isolated, which solves the contradiction between the high energy density laser coupled and the system reliability during the laser processing in the prior art. Additionally, through regulating the type of the nozzle of the laser processing head 100, regulating the pressure parameters of the first fluid and the second fluid, the laser fluid jet from the terminal end can be controlled and regulated, which lays a foundation for optimization of the processing and for realization of versatility of the technology.

Figure 2:
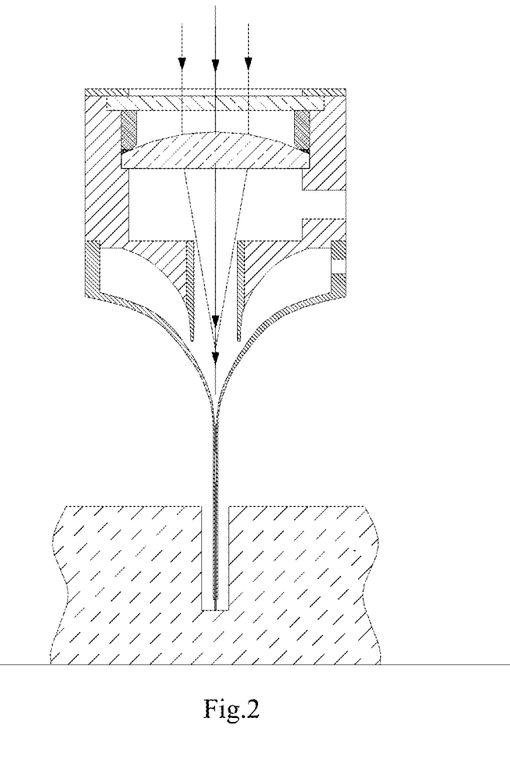
FIG. 2 is a structural schematic diagram illustrating the laser processing head according to one embodiment of the present invention, which deep enters the workpiece for processing operation.
Figure 3:
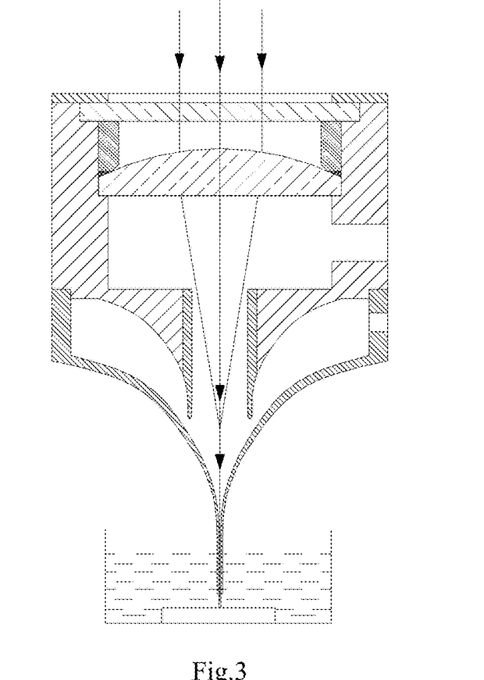
FIG. 3 is a structural schematic diagram illustrating the laser processing head according to one embodiment of the present invention, which deep enters the fluid for processing operation.

Further, the present disclosure also provides application of the laser processing head 100 to deep enter a workpiece or deep enter fluid for processing operation, which overcomes the technical problems encountered in the process of deep entering complex environments or narrow regions for processing operation, and ensures the processing quality. FIG. 2 is a structural schematic diagram illustrating the laser processing head 100 that deep enters the workpiece for processing operation; FIG. 3 is a structural schematic diagram illustrating the laser processing head that deep enters the fluid for processing operation. Preferably, the length of the tail end of the second-level nozzle 120 can be extended according to desires, so as to facilitate to deep enter complex environments and realize processing smoothly.

Figure 4:
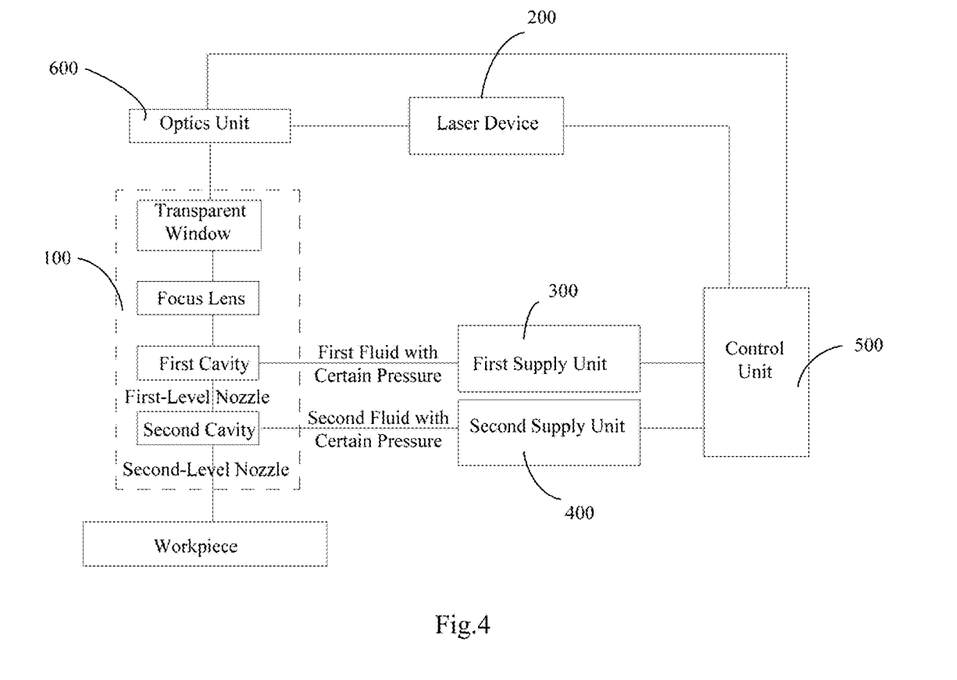
FIG. 4 is a functional schematic diagram illustrating the laser processing system according to one embodiment of the present invention.

As shown in FIG. 4, the present disclosure further provides a laser processing system including a laser processing head 100, a laser device 200, a first supply unit 300, a second supply unit 400, and a control unit 500.

Wherein, the laser device 200 is configured to generate laser; the laser processing head 100 is configured to transmit the laser generated by the laser device to the workpiece to be processed; the first supply unit 300 is configured to provide the first fluid with certain pressure for the laser processing head 100; the second supply unit 400 is configured to provide the second fluid with certain pressure for the laser processing head 100; the control unit 500 is configured to control the operation of the first supply unit 300, the second supply unit 400, and the laser device 200.

As shown in FIGS. 1 and 4, during laser processing, the laser device 200 generates laser, the first supply unit 300 forces the first fluid with certain pressure into the first cavity 150; then the first fluid flows into the first-level nozzle 11; the second supply unit 400 forces the second fluid into the second cavity 160; then the second fluid flows into the second-level nozzle 120; the laser generated by the laser device 200 is coupled into the first fluid and flows into the second-level nozzle along with the first fluid; the first fluid is enveloped by the second fluid in the second-level nozzle 120; the diameter of the first fluid decreases gradually under double constraints of the second-level nozzle 120 and the second fluid; finally, the laser fluid jet is formed and exits from the tail end of the second-level nozzle 120, acting on the workpiece to be processed, thereby realizing laser processing.

Preferably, in the laser processing system, the refractive index of the first fluid is greater than the refractive index of the second fluid. Since the first fluid coupled with laser and enveloped by the second fluid finally exits from the tail end of the second-level nozzle 120 and acts on the workpiece to be processed, when the refractive index of the first fluid is greater than the refractive index of the second fluid, a light guide structure can be formed by the first fluid and the second fluid, which greatly reduces the energy loss of laser during the laser transmission. What's more, the double ductility of the first fluid and the second fluid increases the effective acting distance of the laser, which helps to realize laser processing in large depth or in super large depth.

Preferably, in the laser processing system above, the first fluid is liquid, and the second fluid is gas. This implementation is beneficial for laser coupling and for forming a shape enveloped by the second fluid, which is more controllable. Preferably, the first fluid is water, or other liquid; the second liquid is filtered air, nitrogen, neon or argon, or other gas. The light transmission factor of gas is 1, and the refractive index of water is 1.334, and the incidence angle for total reflection at the boundary between gas and water is 48°, so a combination of the gas and the water can have the effect of a natural optical fiber, namely, the effect of total reflection. The relative larger total reflection angle helps to shorten the transmission length required by variance of diameter, and reduces the energy loss during the laser coupling. What's more, during the laser processing, under the double functions of the gas flow and the water flow, scraps can be removed well, thereby avoiding secondary accumulation of the removed material and enhancing the quality of laser processing.

Additionally, when the first fluid is liquid, the second fluid can be liquid with density less than the density of the first fluid.

When the first fluid is water, and the second fluid is gas, the ultimate value of the laser energy intensity transmitted in pure water is extremely high. As for 532 nm or 1064 nm nanosecond laser, the laser intensity which causes damage to the water is over 6000 MW/cm$^2$, which is far higher than the laser intensity that can cause damage to the common solid fiber (lower than 1000 MW/cm$^2$). With natural water cooling effect, the laser processing system of the present disclosure can transmit laser with large power, including continuous wave laser and pulsed laser. For example, laminar flow water column with diameter of 25 μm can transmit 532 ns or 1064 ns laser with power over 37.5 KW in principle, and laminar flow water column with diameter of 100 μm can transmit laser with power over 600 KW. The inventors made experiments for 800 nm femtosecond laser, 1064 nm and 532 nm picosecond pulsed laser, 1064 nm and 532 nm nanosecond laser, and 1064 nm continuous wave laser, and the reliability of the technical schemes of the present disclosure is verified.

Figure 5:
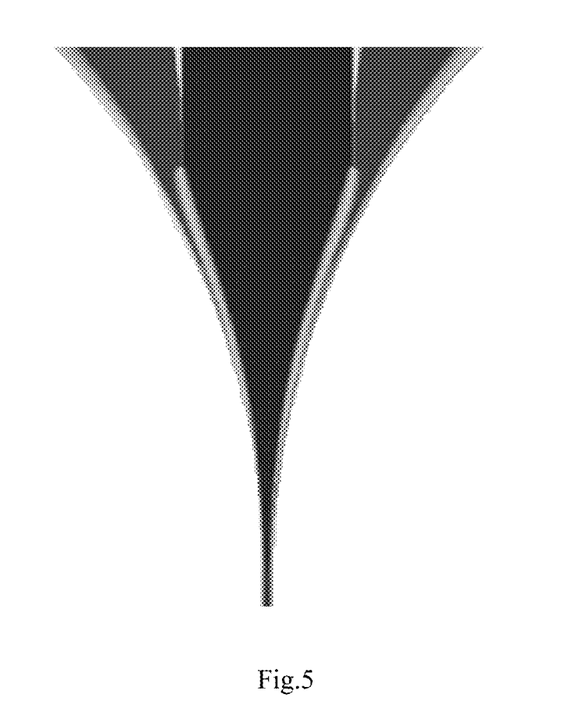
FIG. 5 is a screen shot of simulation of the fluid constraint.

Diameter can be reduced through constraint of the fluid, as is verified by simulation and experimental researches done by the inventors. FIG. 5 is a screen shot of simulation of the air constraint to water flow, which is obtained by means of software ANSYS, wherein, the middle black part is water, and the lateral shallow color part is air. The simulation result shows that laminar flow micro jet, which is enveloped stably, can be formed through regulating relevant parameters of the water flow and gas.

Further, the refractive index of the first-level nozzle 110 of the laser processing head 100 is less than the refractive index of the first fluid, namely, the first-level nozzle 110 has a light guide structure therein. When the first fluid is water, the first-level nozzle 110 can be made of TEFLON AF, refractive index of which is 1.29, and the refractive index of water is 1.334, so a light guide structure can be formed, thereby reducing the energy loss of laser during laser coupling process.

As one of the implementations, the laser processing system further includes an optics unit 600 which is arranged between the laser device and the laser processing head 100. The optics unit 600 includes a reflective lens, a lens adjusting frame, a beam expanding lens, an optical grating, and so on, which ensure that the laser emitted from the laser device 200 is accurately incident into the laser processing head 100.

In the laser processing system, the wave length of the laser emitted from the laser device can be ranged from 266 nm-1100 nm. Lasers with wave length in such a range all attenuate to some extent during transmission in water. The 532 nm laser has the smallest attenuated magnitude, and the effective transmission distance of 532 nm laser is over 20 m; the effective transmission distance of 1064 nm laser is up to 100 mm.

The laser processing system of the present disclosure including the laser processing head 100 can realize gradual coupling of the laser energy, and has a series of advantages such as high coupling reliability, high coupling efficiency, no damages to solid device, small heat influence, high processing quality, expandable processing area and processing effectiveness. The laser processing system of the present disclosure can be applied to laser cutting, laser boring, or laser three-dimension removal processing. Through modification, the laser processing system can be used in more processing applications, such as cleaning under water, welding, etc.

Further, the present invention provides a laser processing method, which comprises steps as follows:

S100. focusing laser, and coupling focused laser into the first fluid in the first-level nozzle;

S200. the first fluid coupled with laser flows into the second-level nozzle, and is enveloped by the second fluid in the second-level nozzle;

S300. under double constraints of the second-level nozzle and the second fluid, the diameter of the first fluid coupled with laser decreases gradually, and finally, the laser fluid jet is formed and exits from the tail end of the second-level nozzle;

S400. the laser fluid jet acts on the workpiece to be processed, thereby realizing laser processing.

In the laser processing method above, the first fluid is liquid, and the second fluid is gas. Preferably, the refractive index of the first fluid is greater than the refractive index of the second fluid. Preferably, the minimum inner diameter of the first-level nozzle is greater than twice of the diameter of the light spot formed by the focused laser. The inner diameter of the tail end of the second-level nozzle is less than half of the minimum inner diameter of the first-level nozzle. The beneficial effects of the technical scheme above have been described in details in the contents related to laser processing head, and will not be described again.

In the laser processing method of the present disclosure, through regulating the type of the nozzle of the laser processing head, regulating the pressure parameters of the first fluid and the second fluid, the diameter of the laser fluid jet can be controlled and regulated, which makes a foundation for optimization of the processing and for realization of versatility of the technology.

The laser processing method of the present disclosure solves the contradiction between the high energy density laser and the system reliability through gradual coupling, and realizes large power laser processing. It should be noted that, the laser processing method of the present disclosure can be performed through the laser processing head of the present disclosure and the laser processing system of the present disclosure. Also, the laser processing method of the present disclosure can be implemented through any other device which meets the requirements.

What described above are several embodiments of the present disclosure, and they are specific and in details, but not intended to limit the scope of the present disclosure. It will be understood by those skilled in the art that various modifications and improvements can be made without departing from the conception of the present disclosure, and all these modifications and improvements are within the scope of the present disclosure. The scope of the present disclosure shall be subject to the claims attached.

What is claimed is:

1. A laser processing head, configured to transmit a laser to a workpiece to be processed, wherein, the laser processing head comprises:
   a first-level nozzle with a first fluid feed of the laser processing head, and
   a second-level nozzle with a second fluid feed of the laser processing head and with a laser-emitting end, which is arranged in a downstream direction relative to the first-level nozzle and communicates with the first-level nozzle;
   wherein, an inner diameter of the second-level nozzle with the second fluid feed of the laser processing head and with the laser-emitting end is gradually decreasing in a laser transmission direction, and a minimum inner diameter of the first-level nozzle is larger than an inner diameter of the laser-emitting end of the second-level nozzle;
   the laser processing head further comprising a first cavity and a second cavity;
   wherein:
   the first cavity communicates with the first-level nozzle;
   the second cavity communicates with the second-level nozzle;
   the first cavity is arranged in an upstream direction relative to the first-level nozzle;
   when the laser processing head is oriented to vertically transmit the laser: (i) a vertical section of an outer wall of the first-level nozzle is arc-shaped, and the outer wall of the first-level nozzle has a continuously decreasing diameter in the laser transmission direction, (ii) a vertical section of an inner wall of the second-level nozzle is arc-shaped, and (iii) a first part of the second-level nozzle has a greater inner diameter than a second part of the second-level nozzle, and the first, part of the second-level nozzle encloses a periphery of the first-level nozzle, forming an arc-shaped region between the outer wall of the first-level nozzle and an inner wall of the second-level nozzle; and
   the second cavity is arranged between the outer wall of the first-level nozzle and the inner wall of the second-level nozzle, and in the arc-shaped region.

2. The laser processing head according to claim 1, wherein, the laser processing head further comprises a focus lens, which is arranged in an upstream direction relative to the first-level nozzle.

3. The laser processing head according to claim 2, wherein, the laser processing head further comprises a transparent window, which is arranged in an upstream direction relative to the focus lens.

4. The laser processing head according to claim 2, wherein, the minimum inner diameter of the first-level nozzle is greater than twice a diameter of a light spot formed by a focused laser; the inner diameter of the laser-emitting end of the second-level nozzle is less than half of the minimum inner diameter of the first-level nozzle.

5. The laser processing head according to claim 1, wherein, the first-level nozzle and the second-level nozzle are integrally molded.

6. A laser processing system, comprising:
   a laser device, which is configured to generate a laser;
   the laser processing head of claim 1, which is configured to transmit the laser to the workpiece to be processed;
   a first supply unit, which is configured to provide a first fluid with a certain pressure for the laser processing head;
   a second supply unit, which is configured to provide a second fluid with a certain pressure for the laser processing head; and
   a control unit, which is configured to control operation of the first supply unit, the second supply unit, and the laser device.

7. The laser processing system according to claim 6, wherein, a refractive index of the first fluid is greater than a refractive index of the second fluid.

8. The laser processing system according to claim 6, wherein, the first fluid is liquid, and the second fluid is gas.

9. The laser processing system according to claim 6, wherein, a refractive index of the first-level nozzle of the laser processing head is less than a refractive index of the first fluid.

10. The laser processing system according to claim 6, further comprising an optics unit which is arranged between the laser device and the laser processing head.

11. A laser processing method, comprising steps of:
    feeding a first fluid by a first fluid feed of a laser processing head;
    focusing a laser, and coupling the focused laser into the first fluid in a first-level nozzle;
    wherein when the first-level nozzle is oriented to vertically transmit the first fluid coupled with the laser, a vertical section of an outer wall of the first-level nozzle is arc-shaped, and the outer wall of the first-level nozzle has a continuously decreasing diameter in a laser transmission direction;
    feeding a second fluid by a second fluid feed of the laser processing head;
    the first fluid coupled with the laser flowing into a second-level nozzle and being enveloped by the second fluid in the second-level nozzle; wherein, when the second-level nozzle is oriented to vertically transmit the second fluid and the first fluid coupled with the laser, a vertical section of an inner wall of the second-level nozzle is arc-shaped; a first part of the second-level nozzle has a greater inner diameter than a second part of the second-level nozzle, and the first part of the second-level nozzle encloses a periphery of the first-level nozzle, forming an arc-shaped region between the outer wall of the first-level nozzle and an inner wall of the second-level nozzle;
    decreasing the diameter of the first fluid coupled with the laser, the first fluid coupled with the laser being further constrained by the second-level nozzle and the second fluid;
    a laser fluid jet being formed and exiting from a laser-emitting end of the second-level nozzle; and
    processing a workpiece by the laser fluid jet acting on the workpiece.

12. The laser processing method according to claim 11, wherein, the first fluid is liquid, and the second fluid is gas.

13. The laser processing method according to claim 11, wherein, a refractive index of the first fluid is greater than a refractive index of the second fluid.

14. The laser processing method according to claim 11, wherein, a minimum inner diameter of the first-level nozzle is greater than twice of a diameter of a light spot formed by a focused laser;

an inner diameter of a the laser-emitting end of the second-level nozzle is less than half of the minimum inner diameter of the first-level nozzle.

15. The laser processing method according to claim 11, wherein, diameter of the laser fluid jet in the second-level nozzle is regulated through regulating pressure of the first fluid and the second fluid.

16. The laser processing method according to claim 13, wherein, a diameter of the laser fluid jet in the second-level nozzle is regulated through regulating pressure of the first fluid and the second fluid.

17. The laser processing method according to claim 14, wherein, a diameter of the laser fluid jet in the second-level nozzle is regulated through regulating pressure of the first fluid and the second fluid.

* * * * *

UNITED STATES PATENT AND TRADEMARK OFFICE
CERTIFICATE OF CORRECTION

PATENT NO. : 11,219,968 B2
APPLICATION NO. : 15/523229
DATED : January 11, 2022
INVENTOR(S) : Wenwu Zhang et al.

It is certified that error appears in the above-identified patent and that said Letters Patent is hereby corrected as shown below:

In the Claims

In Column 11, Line 41, replace "first, part" with --first part--.

In Column 12, Line 66, replace "twice of a diameter" with --twice a diameter--.

In Column 13, Line 1, replace "diameter of a the laser-emitting" with --diameter of the laser-emitting--.

Signed and Sealed this
Second Day of May, 2023

Katherine Kelly Vidal
*Director of the United States Patent and Trademark Office*